J. MATHY.
DOMESTIC BAKER AND STEAMER.
APPLICATION FILED FEB. 7, 1906.
925,781.
Patented June 22, 1909.
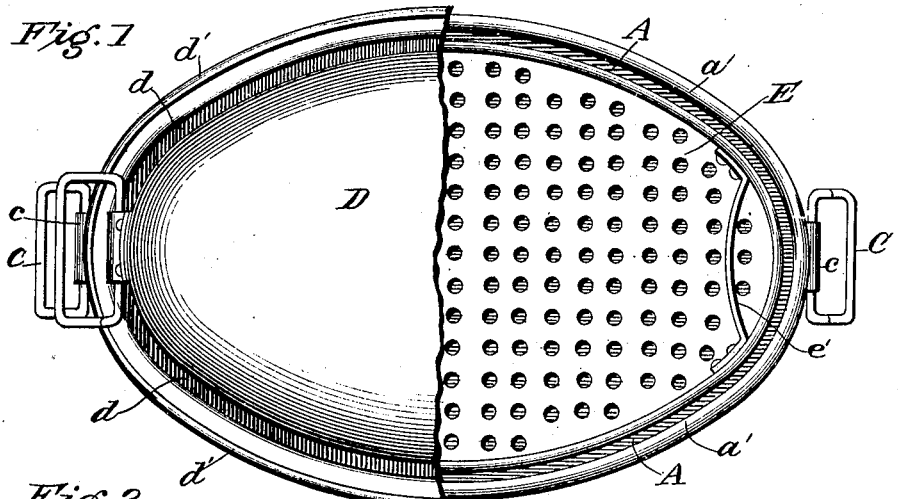
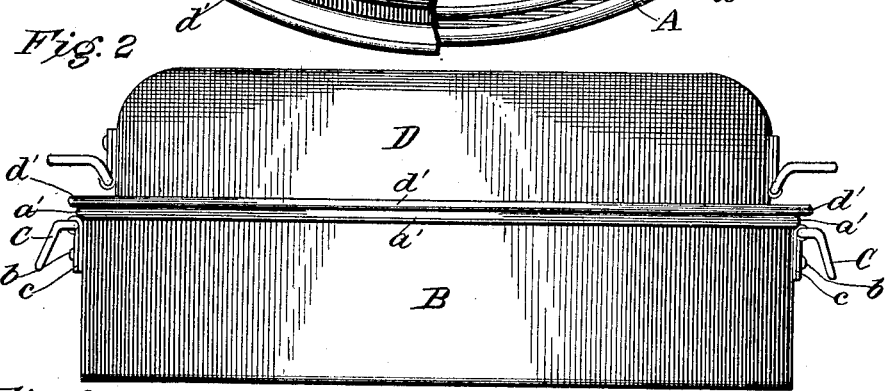
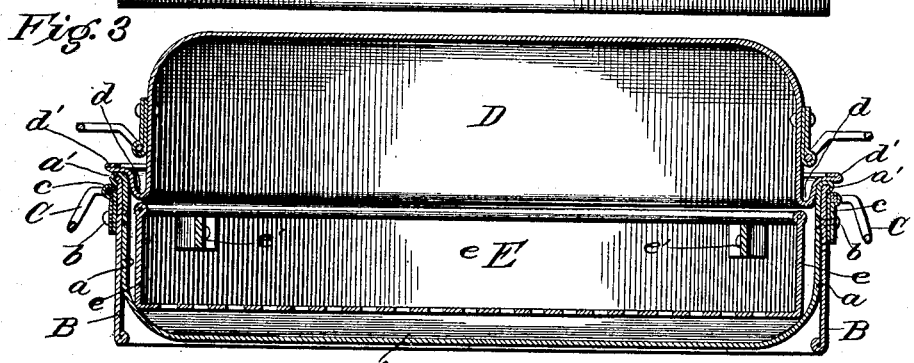
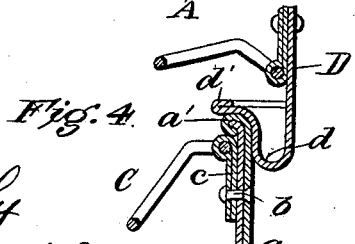
WITNESSES:
INVENTOR
Joseph Mathy
BY
ATTORNEYS
THE NORRIS PETERS CO., WASHINGTON, D. C.

UNITED STATES PATENT OFFICE.

JOSEPH MATHY, OF WASHINGTON, DISTRICT OF COLUMBIA.

DOMESTIC BAKER AND STEAMER.

No. 925,781.  Specification of Letters Patent.  Patented June 22, 1909.

Application filed February 7, 1906. Serial No. 300,018.

*To all whom it may concern:*

Be it known that I, JOSEPH MATHY, of Washington, in the District of Columbia, have invented certain new and useful Improvements in Domestic Bakers and Steamers; and I hereby declare that the following is a full, clear, and exact description thereof, reference being had to the accompanying drawings, which form part of this specification.

This invention is an improvement in culinary utensils and in particular is an improved domestic baker and steamer especially adapted for cooking meats, fowls and other articles of food, and is designed to cook the same perfectly without the necessity of basting and without the use of any water other than that contained in the articles themselves when the same are to be baked; but when the articles of food are to be steamed, a small quantity of water must be placed in the vessel before it is placed over the fire or in the oven.

The invention consists of the improved construction of the baker as hereinafter described and claimed and illustrated in the accompanying drawings, in which—

Figure 1 is a plan view, partly broken, of the complete baker, showing the steaming vessel therein. Fig. 2 is a side view thereof. Fig. 3 is a longitudinal, vertical section through the same; and Fig. 4 is a detail view showing the construction of the joints or bends in the body and cover of the device, on an enlarged scale.

The complete utensil comprises a base-portion or pan and a cover therefor (which two parts constitute a complete device when used as a baker), and a steaming vessel to be placed within the pan when the device is used as a steamer.

The pan A consists, preferably, of an oval-shaped vessel having its bottom, sides and ends stamped from one piece of sheet metal without any seams, joints or sharp angles. The side walls $a$ of the pan A are substantially vertical for the greater part of their length and are reinforced by an exterior band B which constitutes a support for the pan and extends sufficiently below the bottom of the pan to prevent contact of the latter with the bottom of the oven, the stove, or any support on which the pan may be placed. The upper edge of the pan is turned over the upper edge of the band B, as shown at $a'$, so as to form a close joint therewith and prevent injury to the user by contact with any sharp edges. This close fit between the band and sides of the pan will be, ordinarily, sufficient to prevent the former disengaging the latter, but the disengaging thereof is effectually prevented by means of the rivets $b$ by which the ears $c$ of the handles C are fastened to the ends of the pan, as shown.

The cover D is approximately of the same form as the pan A, but inverted, and, like the pan, has no sharp angles or corners at any point to make it difficult to cleanse. The lower edge of this cover is provided with a deep return bend or bead $d$ opening upwardly and outwardly as regards the main body of the cover and having parallel sides. The outer edge of this bead or bend $d$ is bent outwardly at right-angles and thence inwardly upon itself, forming a stiff flange $d'$ at right-angles to the bead $d$. The bead $d$, is adapted to fit closely within the upper edge of the pan and by reason of its depth will form a tight joint therewith so that steam or moisture will not be liable to escape between the pan and cover. Owing to the U-shape of the bead $d$, it has sufficient resiliency or spring to insure a close fit between it and the edge of the pan, and, furthermore, any water of condensation on the cover rolling down the sides thereof can drop directly down into the vessel E, if used, or into the pan, from the lower edge of the bend or bead $d$, instead of slowly trickling down the sides of the pan.

A vessel E with approximately the same contour in plan as the pan, but of smaller size, is provided, so that it can be placed within the pan A. The sides $e$ of the vessel E are so constructed that they will not obstruct the proper fit between the cover and the pan. The bottom of this vessel E is preferably perforated so as to permit the passage of steam therethrough, and the steam can also pass around the outer edges of the vessel, as is obvious. This vessel E may be provided with handles or hand-pieces $e'$ at its ends, of any suitable construction, by which it can be readily placed in or removed from the pan.

When the device is to be used as a baker, the vessel E can be removed and the article to be cooked—such as a roast, or a fowl—placed directly in the pan and the cover fitted tightly thereover. It is not necessary to pour any water in the pan when it is to be used for baking purposes, as the steam from the article being cooked will suffice to prevent burning thereof on the top and sides, and a sufficient quantity of steam will condense upon the cover and roll down into the pan to prevent the burning of the article on the underside. Owing to the shape of the cover, the moisture condensed thereon is immediately returned into the pan and descends to the bottom thereof underneath the article being cooked and this is preferable in practice to having the condensed moisture precipitated onto the article being cooked, as is the case in the so-called "self-basting" bakers.

When the device is to be used for steaming food, the articles of food are placed in the vessel E, within the pan, a small quantity of water or wine, etc., poured into the pan under the vessel; and the cover is then placed over the pan and the device placed on the stove, or in the oven, for cooking. Owing to the close fit of the cover, the articles in the vessel will be perfectly steamed.
Whether the device is used as a baker or as a steamer, it will require no attention other than to remove the article when it has been in a sufficient length of time to become thoroughly cooked, which, with this device, does not require as much time as do the old devices,—while the articles of food are cooked in a much superior manner than is possible with the old style bakers or with an open pan.

Having described my invention what I claim as new and desire to secure by Letters Patent is—

In a baker, the combination of a pan stamped out of sheet metal and having upturned sides outwardly flanged on their upper edges, a supporting band encircling the pan and closely fitted to and around the vertical portions of the sides thereof and extending below the bottom of the pan; a cover similar in form to the pan when inverted but of smaller diameter and having a deep U-shaped return bend or bead on its lower edge the outer side of such bend being adapted to fit closely within the mouth of the pan and make a tight joint therewith while the lower end of the bend is out of contact with the sides of the pan, and having an outwardly projecting flange on the upper outer end of said bend adapted to rest upon the upper edge of the pan; and handles riveted to the pan and band, all substantially as and for the purpose described.

In testimony that I claim the foregoing as my own, I affix my signature in presence of two witnesses.

JOSEPH MATHY.

In presence of—
    JAMES R. MANSFIELD,
    ARTHUR E. DOWELL.